USO05733674A

United States Patent [19] [11] Patent Number: 5,733,674
Law et al. [45] Date of Patent: Mar. 31, 1998

[54] POWER SUPPLY SYSTEMS FOR PORTABLE ELECTRONIC DEVICES

[76] Inventors: Steven Law; Kam Tong Ng, both of #202 4580 Main Street, Vancouver, British Columbia, Canada, V5V 3R5

[21] Appl. No.: 799,976

[22] Filed: Feb. 12, 1997

[51] Int. Cl.[6] .................................................. H01M 2/10
[52] U.S. Cl. ........................... 429/9; 429/97; 429/99; 429/123; 320/15
[58] Field of Search .............................. 429/9, 7, 96–100, 429/123; 320/2, 15

[56] References Cited

U.S. PATENT DOCUMENTS

| | | | |
|---|---|---|---|
| 4,969,206 | 11/1990 | Desrochers | 429/9 X |
| 5,172,043 | 12/1992 | Toops | 320/2 |
| 5,223,780 | 6/1993 | Hu | 320/14 |
| 5,268,629 | 12/1993 | Franke | 320/2 |
| 5,504,412 | 4/1996 | Chan et al. | 320/2 |
| 5,508,123 | 4/1996 | Fan | 429/96 |
| 5,545,491 | 8/1996 | Farley | 429/7 |

*Primary Examiner*—Anthony Skapars
*Attorney, Agent, or Firm*—Michael R. Schacht; Hughes, Multer & Schacht, P.S.

[57] ABSTRACT

A power supply system that allows a user to standardize on one or two battery types and use these supported types to power electronic devices designed to use other, non-supported battery types. A battery sleeve is provided to convert the form factor of one battery to that of another battery. The system may also include a battery pack assembly that allows batteries of a supported type to be used to power electronic devices designed to use a conventional, proprietary battery pack design. Such battery pack assemblies allow dedicated, single use battery chargers sold with a given electronic device to be used to charge consumer capped batteries that may be used in other electronic devices. A universal charger/power supply unit may be provided that can used to charge a variety of rechargeable batteries and provide power to a variety of electronic devices.

10 Claims, 9 Drawing Sheets

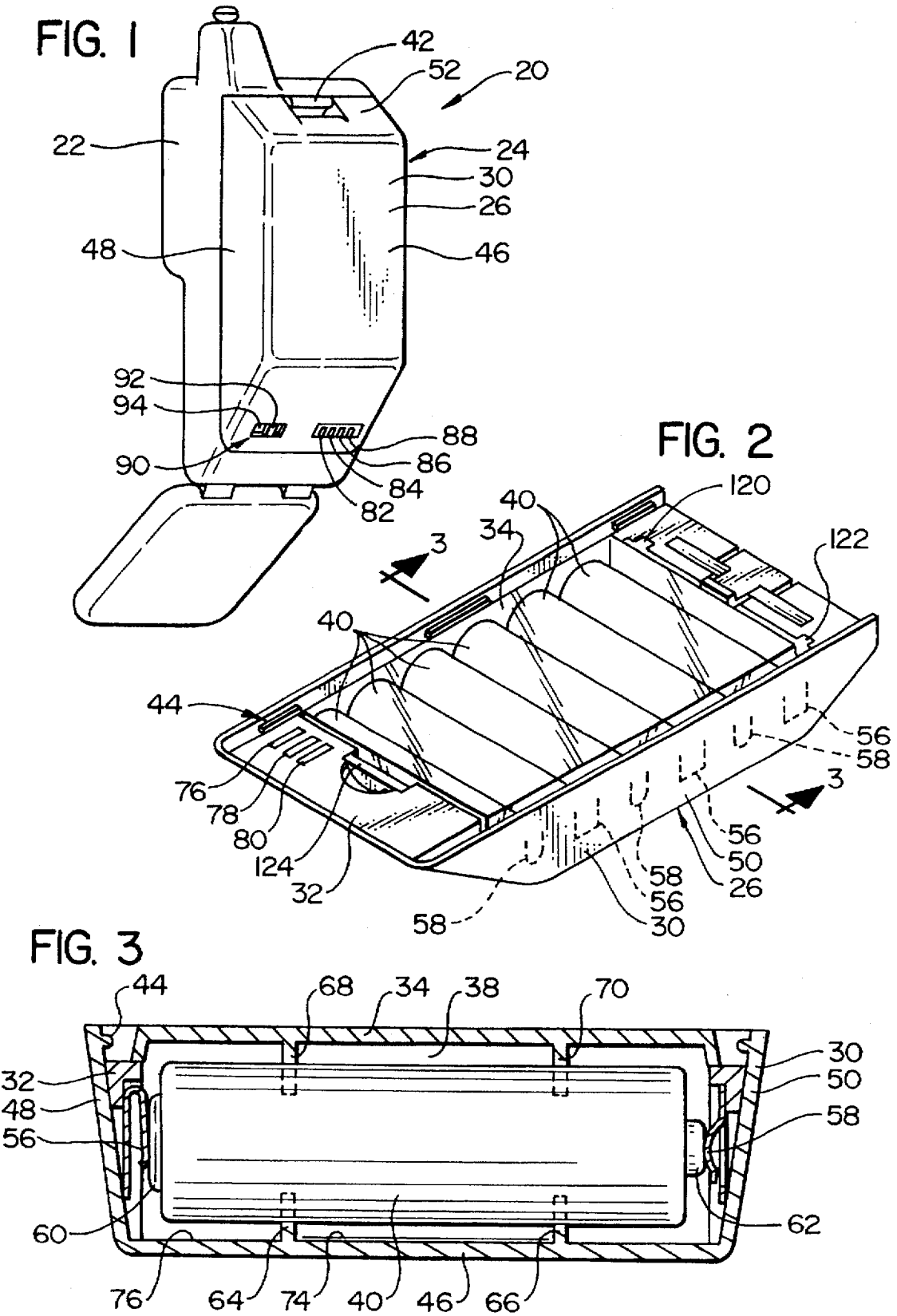

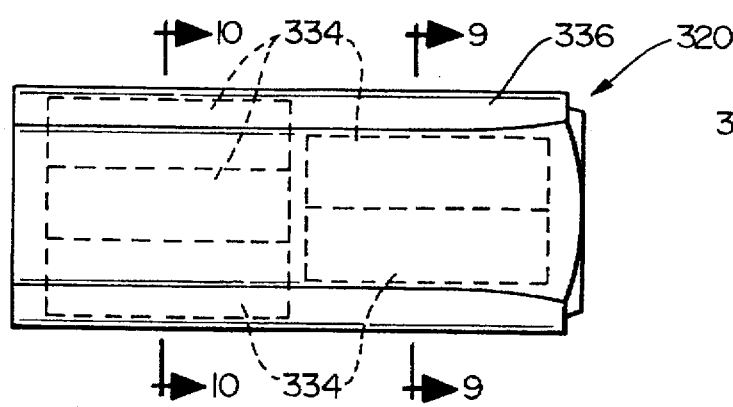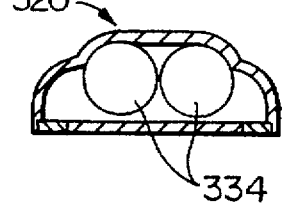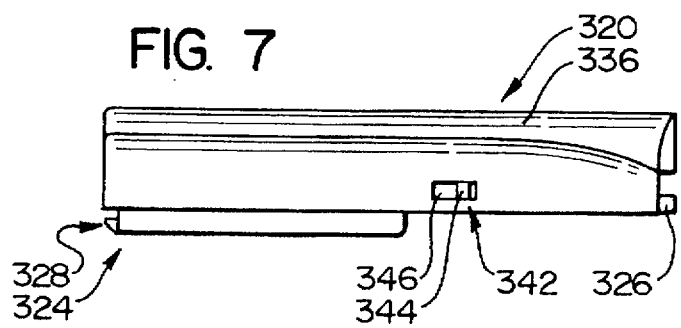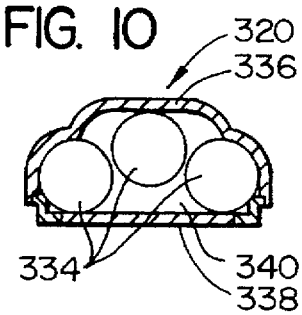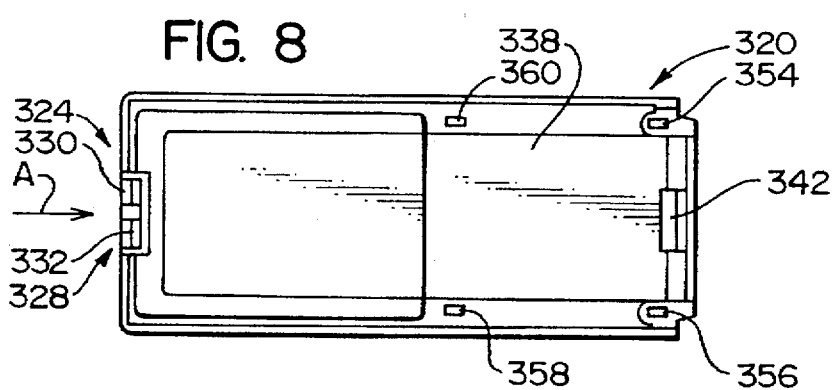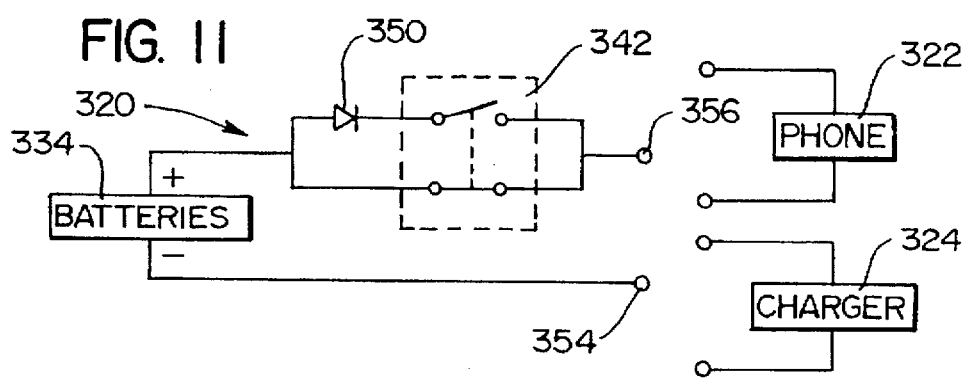

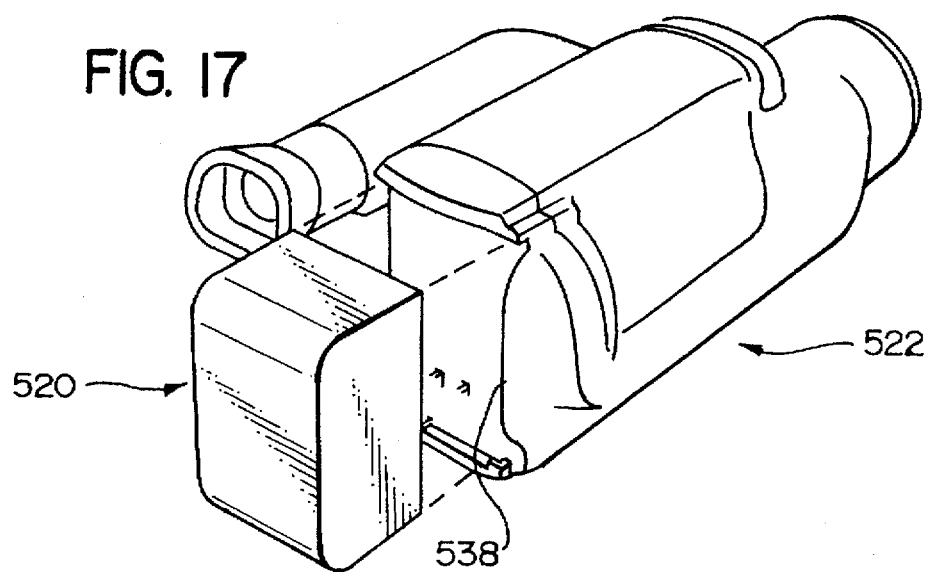
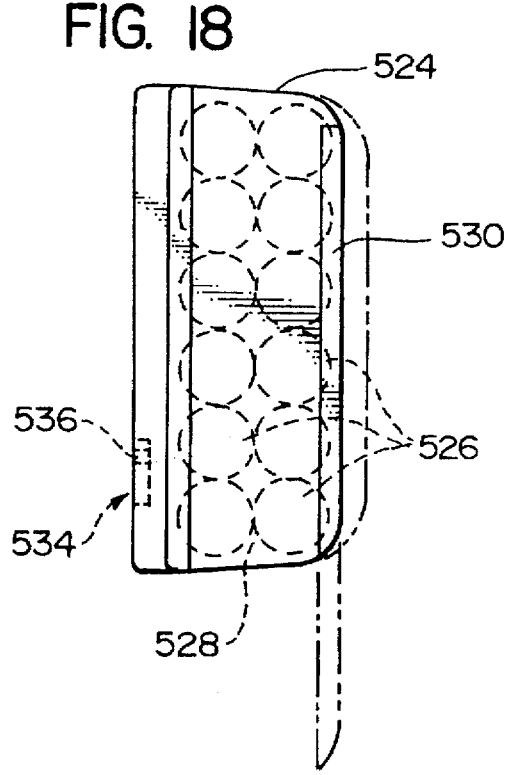
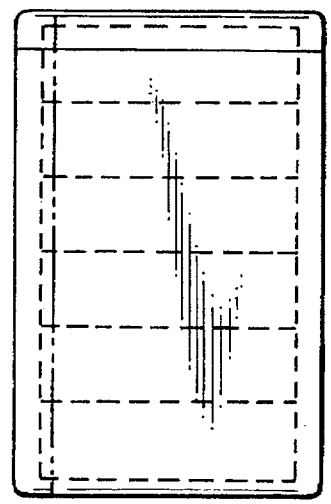
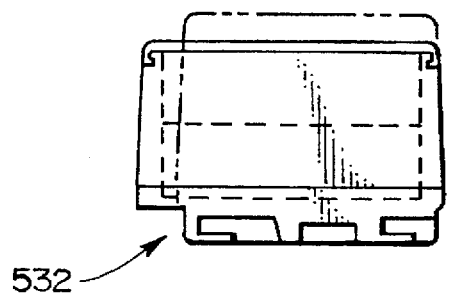

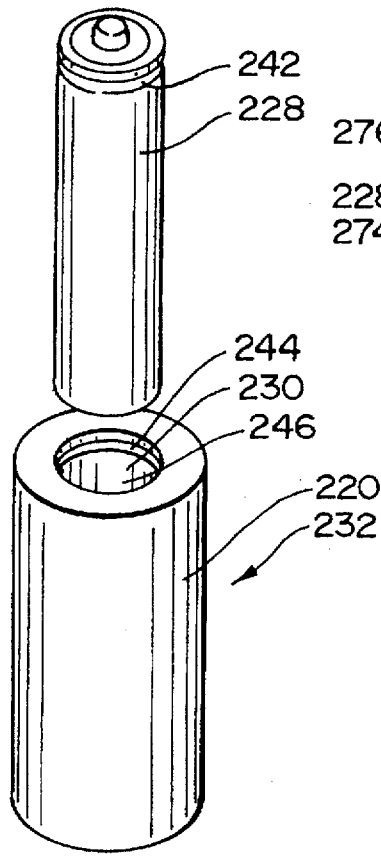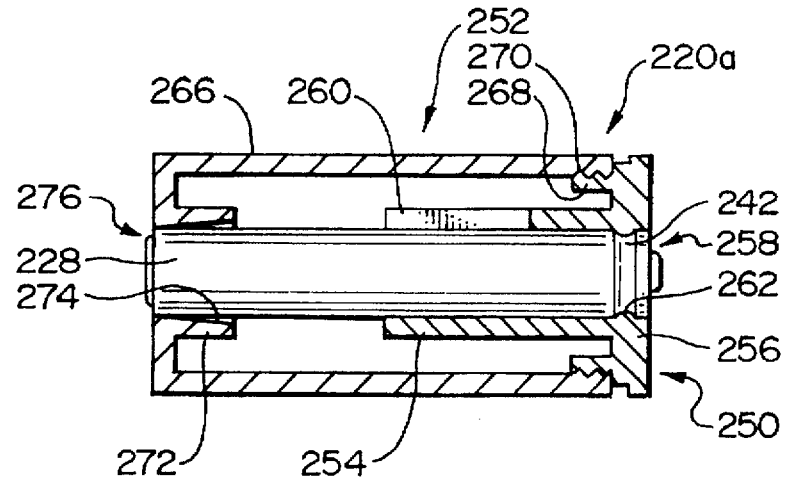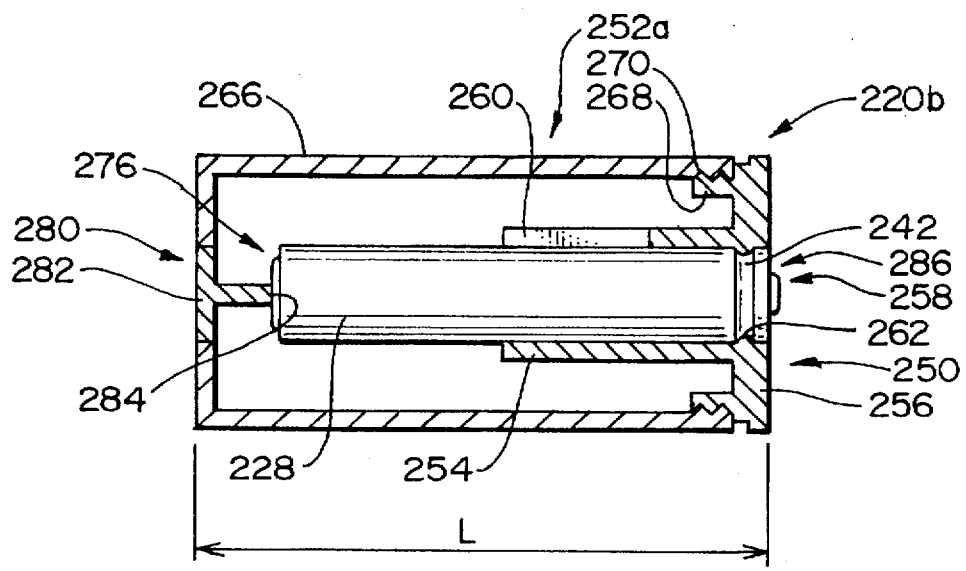

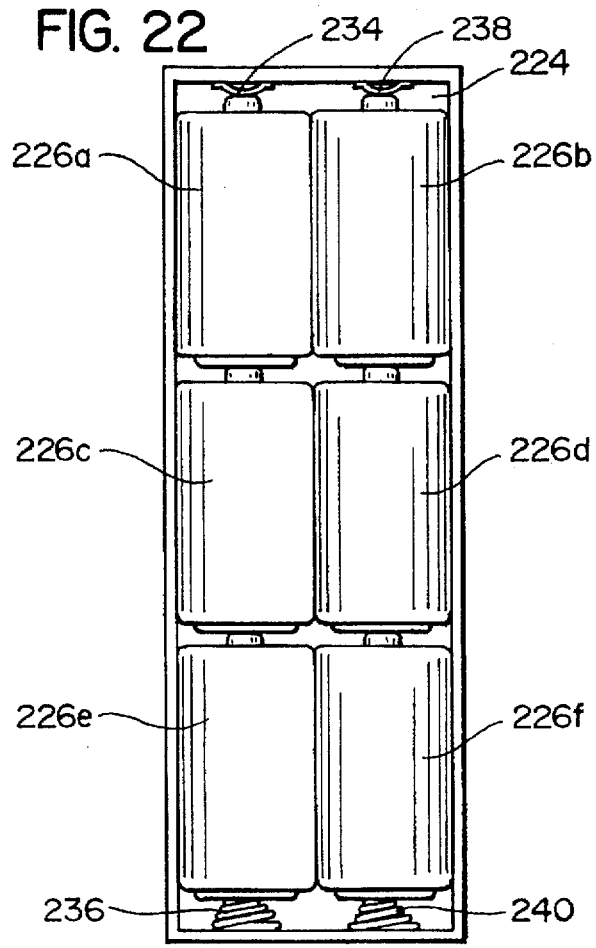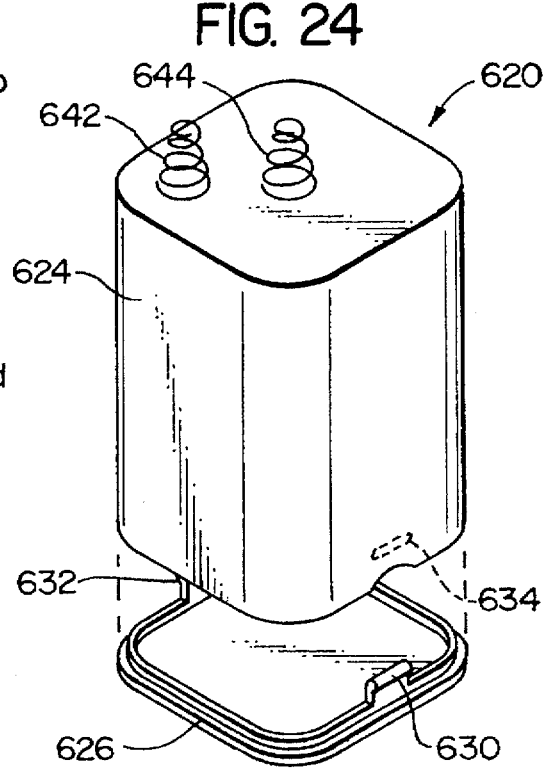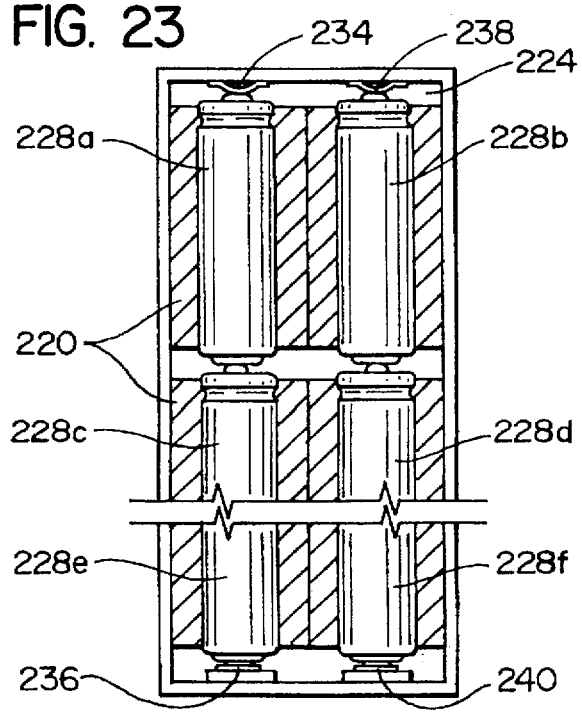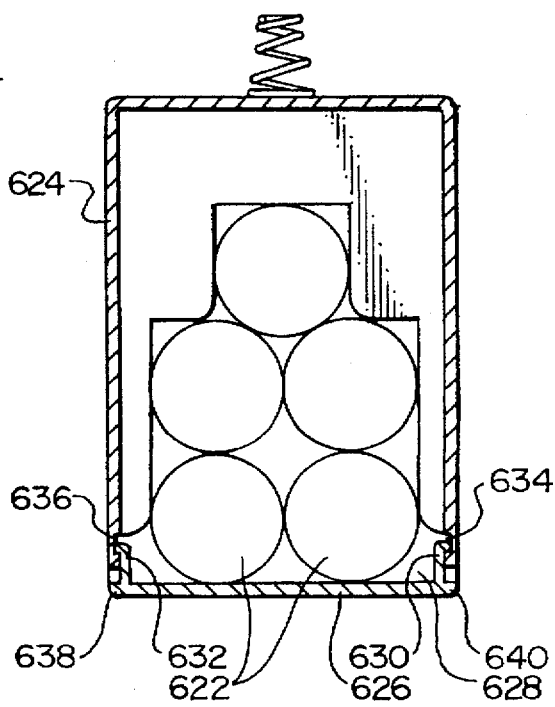

POWER SUPPLY SYSTEMS FOR PORTABLE ELECTRONIC DEVICES

TECHNICAL FIELD

The present invention relates to power supplies for electronic devices and, more specifically, to power supplies comprising battery packs that allow the electronic device to operated without connection to a utility power source.

BACKGROUND OF THE INVENTION

Electronic devices are often made in a portable form. Such portable electronic devices usually include a similarly portable power supply as they are often used where utility power is unavailable. Examples of electronic devices that are manufactured solely or optionally in portable form are cellular telephones, CD players, radios, computers, and video cameras.

Portable power supplies employ one or more batteries as an electrical power source. These batteries are conventional, but a brief discussion of commercially available batteries is appropriate at this time to establish the context in which the present invention has been made.

Batteries are sold in several basic forms: they can be consumer capped batteries, which are configured for sale directly to the end user, or industrial capped batteries, which are configured for sale to and use by industry. The primary difference between consumer and industrial capped batteries is in the physical configuration of the battery, and especially the construction of the positive and negative contacts of the batteries.

Additionally, in this application the term "battery type" will refer to the standard names assigned to batteries having certain physical and voltage characteristics. Examples of commonly used consumer capped battery types are AAA, AA, A, B, C, D, 6 volt, 9 volt, and 12 volt. These names each refer to a specific set of physical and voltage characteristics that uniquely identify batteries for selection and replacement.

Conventional batteries may also be classified as either rechargeable or non-rechargeable (alkaline) depending upon the chemical makeup of the battery.

Returning now to the discussion of power supplies for portable electronics, such power supplies differ in the way in which the batteries employed therein are physically connected to the electronic device. Portable power supplies can either employ: (a) one or more discrete batteries or (b) a battery pack which encapsulates one or more discrete batteries.

A power supply employing a discrete battery arrangement comprises discrete consumer capped batteries inserted into a battery compartment. The power requirements of the electronic device determine the type and number of discrete batteries employed; the battery compartment is designed to accommodate an appropriate number of batteries of the given type.

For example, portable stereo systems will often employ a battery compartment designed to accommodate six C-type batteries physically arranged in pairs placed end-to-end and electrically connected in series. In this context, either rechargeable or alkaline batteries may be used as long as they are of the appropriate type.

Power supplies that use a battery pack arrangement normally comprises a container for the battery or batteries that is uniquely designed for the electronic device to be powered. The battery pack container is attached to the electronic device such that an appropriate electrical connection is formed between the batteries within the container and the electronic device.

Batteries used in battery packs are rechargeable and industrial capped. The electrical connections between these batteries are formed by soldering or the like, and the container in which the batteries are enclosed is sealed to prevent access to the batteries therein. Common examples of conventional battery packs are the battery packs sold with cellular telephones, portable video cameras, and portable computers.

Because conventional battery packs contain rechargeable batteries, means must be provided to recharge the batteries within the battery pack. The batteries cannot be removed for recharging, so battery packs are normally charged by chargers specifically designed for use with a given type of battery pack.

An electronic device and battery pack are thus normally sold with a charger dedicated to charging a given type of battery pack. In practice, this type of charger is capable of charging only the battery pack with which it is sold. If a consumer has a cellular telephone, video camera, and portable computer, the consumer will own at least one charger for each of these electronic devices.

With battery packs, the possibility exists that a battery pack will become discharged and, because of time constraints and/or the fact that the charger is not on hand, cannot be recharged. In this case, the electronic device simply cannot be used. This can be a significant problem in many situations, such as when the electronic device is a cellular telephone in an emergency situation or a video camera at an important family event. The common way to lessen the likelihood of such an occurrence is to purchase one or more extra power packs. These power packs are expensive, and it still may be possible that even the extra power pack will be discharged at a critical time.

After a number of charge/discharge cycles, batteries will become spent, and the entire battery pack must be discarded and replaced at significant cost; it is not practical or cost effective to remove and replace the batteries in a conventional battery pack. Conventionally, battery packs thus require that a good battery pack container be discarded along with the spent batteries therein.

Additionally, while batteries may be spent for one purpose (such as providing power to a cellular telephone or video camera), the same batteries may be adequate for other purposes (such as providing power to CD players, flashlights, and the like). Thus, conventional battery packs thus require that batteries perfectly suited for certain purposes be discarded simply because they are not of suitable form.

The foregoing discussion makes it clear that consumers and manufacturers do not take a systematic approach to the problem of supplying power to portable electronic devices. A typical household may contain electronic devices requiring two, three, or more types of power packs, a charger for each power pack, electronic devices requiring batteries of each of the different battery types, discrete alkaline batteries of different battery types, discrete rechargeable batteries of different battery types, and a general purpose battery charger for the discrete rechargeable batteries. All of these different power supplies must be kept on hand and/or fully charged; if one or more of these is not on hand or not fully charged, any electronic device using that type of power supply will not be operable.

This ad hoc approach to providing power to portable electronic devices results in excessive inventory costs for both consumers and industry, significant likelihood that such power will not be available when required, and increased environmental pollution as non-spent parts must be discarded rather than reused.

RELATED ART

The Applicant is aware of attempts to solve the problem, discussed above, in which a battery pack is discharged in a critical situation. Energizer currently markets a product that allows a Motorola cellular telephone to be powered by consumer capped alkaline batteries. This product consists of a container similar to that of the battery pack sold with the telephone, and the container is attached to the telephone such that the alkaline batteries power the telephone. This product contains a door covering the battery compartment, and a new set of alkaline batteries may be placed into the compartment when the previous set is spent.

Several video camera manufacturers have designed their video cameras to obtain power either from a dedicated battery pack or by using a number of discrete, consumer capped alkaline batteries. In one brand, the discrete alkaline batteries are placed into an adapter that fits into the area designed for the dedicated battery pack. In another brand, a compartment into which the dedicated battery pack is placed is also designed to accommodate the discrete alkaline batteries.

These products do not attempt to systematize the process of providing power to portable electronic devices, but instead are directed to solving the problem with providing emergency power to several particular electronic devices.

The following references were uncovered as part of a professional patentability search conducted on behalf of the applicant.

U.S. Pat. No. 5,223,780 to Hu discloses a battery pack for cellular telephones that includes a circuit for discharging the batteries before they are recharged. This will reduce the memory affect problem that reduces the life of many rechargeable batteries. This patent does not address the problem of using both rechargeable and alkaline batteries and certainly does not teach or suggest using the cellular phone battery pack as a recharger for batteries.

U.S. Pat. No. 5,172,043 to Toops discloses a battery pack having circuitry which allows rechargeable batteries to be both recharged and discharged but which prevents the recharge of standard alkaline batteries. This device apparently requires a battery having a modified terminal that indicates whether the battery is rechargeable or not. Apparently, this patent would require the use of non-standard batteries.

U.S. Pat. No. 5,504,412 to Chan et al. discloses a battery pack for a wet/dry vacuum cleaner. This patent primarily relates to the physical configuration of the battery pack which allows the battery pack to be recharged while attached to the vacuum cleaner. This patent apparently is directed to the specific mechanical inter-connection between the battery pack and the device to be powered. In other respects, it is very similar to the battery packs for certain brands cellular phones in which the battery can be recharged while the battery pack is still attached to the phone.

U.S. Pat. No. 5,268,629 to Franke relates to the removal of rechargeable batteries when they are spent. This patent relates to the means by which a power cord is disconnected from the electrical device when the batteries are removed. This patent does not relate to the use of both rechargeable and alkaline batteries in a single device.

The need thus exists for a systematic approach to providing power to portable electronic device that eliminates the problems discussed above.

OBJECTS OF THE INVENTION

From the foregoing, it should be apparent that a primary object of the present invention is to provide improved methods and systems for providing power to portable electronic devices.

Another, more specific, goal of the present invention is to provide methods and systems for providing power to portable electronic devices having the following characteristics:

a. allow the user to standardize on one or at most two battery types;

b. eliminate the need for multiple, single use chargers;

c. convert single use chargers into multiple use chargers;

d. allow alkaline and rechargeable batteries to be used interchangeably and in a safe manner;

e. allow rechargeable batteries that fail to hold a charge suitable for use with one type of electrical device be used in a second, less demanding type of electrical device rather than be discarded;

f. obviate the need to dispose of battery pack containers when the batteries therein are spent;

g. allow one battery type to be converted for use as another battery type;

h. allow batteries that do not provide current sufficient for certain high demand electronic devices be used for low demand electronic devices;

i. allow batteries to be reconditioned by discharging them fully before recharging to reduce the memory effect to which certain rechargeable batteries are subject; and j. provide the user with an option to purchasing high priced, single use battery packs.

SUMMARY OF THE INVENTION

These and other objects are obtained by the present invention, which is a system for providing power to portable electronics. This system uses a number of novel devices and methods to provide a user with significant flexibility in deciding how power is to be supplied to such portable electronic devices.

In particular, the present invention allows the user to provide power to almost any portable electronic device using one or perhaps two types of batteries. For example, a consumer may decide to standardize, within his or her household, on AA and C size batteries. These batteries will be referred to batteries of a supported type.

For batteries of a different, non-supported type, a battery sleeve or adapter is provided to allow the form factor of one of the supported batteries to adapted to fit the form factor of a non-supported battery type.

Generally, the use of a battery sleeve requires that a battery of a smaller form factor be used in place of a battery of a larger form factor. This can mean that the power time will be decreased, but this can be compensated for to some extent by purchasing relatively higher capacity batteries. These higher capacity batteries will cost more up front, but they will provide charge times roughly equivalent to larger, lower capacity batteries, and these costs can be recovered over time by being able to reuse the batteries and in convenience to the user.

The system of the present invention also can include a battery pack assembly adapted to receive either rechargeable or non-rechargeable batteries. The battery pack assembly of the present invention is adapted to provide power to an electronic device such as a cellular telephone or video camera in place of the dedicated, disposable power pack sold with the electronic device. But the present battery pack assembly, unlike conventional battery packs, allows the electronic device to be operated using either rechargeable or non-rechargeable batteries as circumstances dictate.

The battery pack assembly of the present invention is further adapted to allow rechargeable batteries contained therein to be charged using the dedicated charger sold with the electronic device. This capability leverages the user's existing investment in chargers and the like by allowing these chargers to be used to charge consumer capped rechargeable batteries that can be used in other electronic devices.

A boot module may also be provided as part of the system. The boot module would allow batteries to be recharged and also form a universal external power supply for electronic devices configured to operate on an external power source. The boot module would further facilitate the reuse of batteries that are considered spent for the purposes of high demand electronic devices but which still have sufficient charge holding capacity to power other, lower demand, electronic devices.

The present invention is thus a systemized method or approach to providing power to portable electronic devices that obtains the objects of the invention cited above.

BRIEF DESCRIPTION OF THE DRAWINGS

FIG. 1 is a perspective view of a first embodiment of a power pack constructed in accordance with, and embodying, the principles of the present invention;

FIG. 2 is a perspective view showing an interior side of the power pack depicted in FIG. 1;

FIG. 3 is a section view taken along lines 3—3 in FIG. 2;

FIG. 6 is a top plan view of a second embodiment of a power supply of the present invention;

FIG. 7 is a side elevational view of the power supply shown in FIG. 6;

FIG. 8 is a bottom plan view of the power supply shown in FIG. 6;

FIG. 9 is a section view taken along lines 9—9 in FIG. 6;

FIG. 10 is a section view taken along lines 10—10 in FIG. 6;

FIG. 11 is a schematic circuit diagram depicting the inner connection between the power supply as shown in FIG. 6–10 and a charger or cellular telephone;

FIG. 17 is a perspective view showing an electrical assembly using a fourth embodiment of a power supply to the present invention;

FIG. 18 is a side elevational view of the power supply shown in FIG. 17;

FIG. 19 is a top plan view of the power supply of FIG. 17;

FIG. 20 is an end elevational view of the power supply shown in FIG. 17;

FIG. 21 is a perspective view showing yet another exemplary power supply assembly constructed in accordance with, and embodying, the principles of the present invention;

FIG. 22 depicts a conventional battery compartment employing conventional batteries;

FIG. 23 depicts the power supply assemblies of FIG. 21 being used in the compartment depicted in FIG. 22 in place of the conventional batteries shown in FIG. 22;

FIG. 24 is a perspective view of a sixth embodiment of the power supply constructed in accordance with the present invention;

FIG. 25 is a section view of the power supply depicted in FIG. 24;

DETAILED DESCRIPTION

Referring initially to FIG. 1, depicted therein is a portable electrical appliance assembly 20 comprising an appliance 22 and a power supply 24 constructed in accordance with, and embodying, the principles of the present invention.

The exemplary appliance 22 is a cellular telephone of the type manufactured by Motorola. The telephone 22 is well known in the art and will not be described herein beyond the extent necessary for a complete understanding of the present invention.

Figure 5:
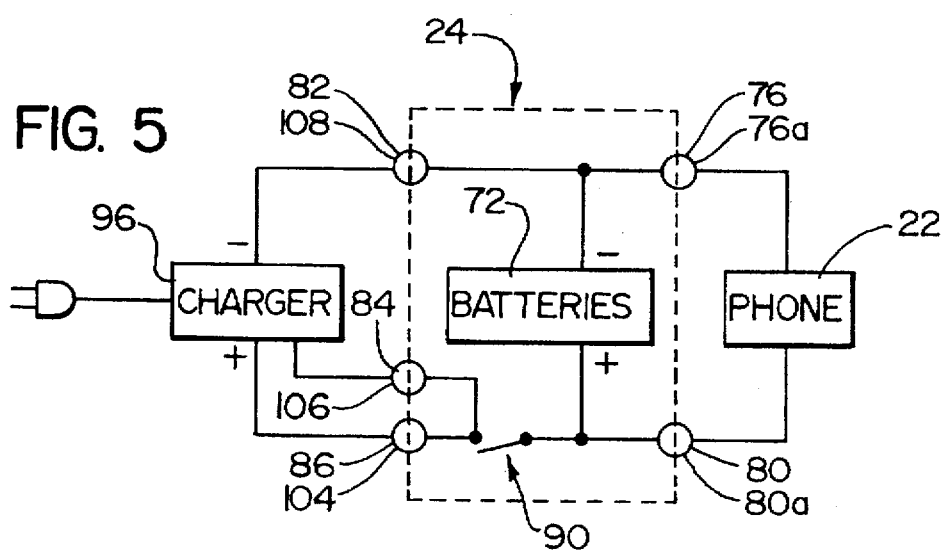
FIG. 5 is a schematic diagram of the electrical circuit formed by a cellular telephone, battery charger, and the power supply of the present invention.
Figure 12:
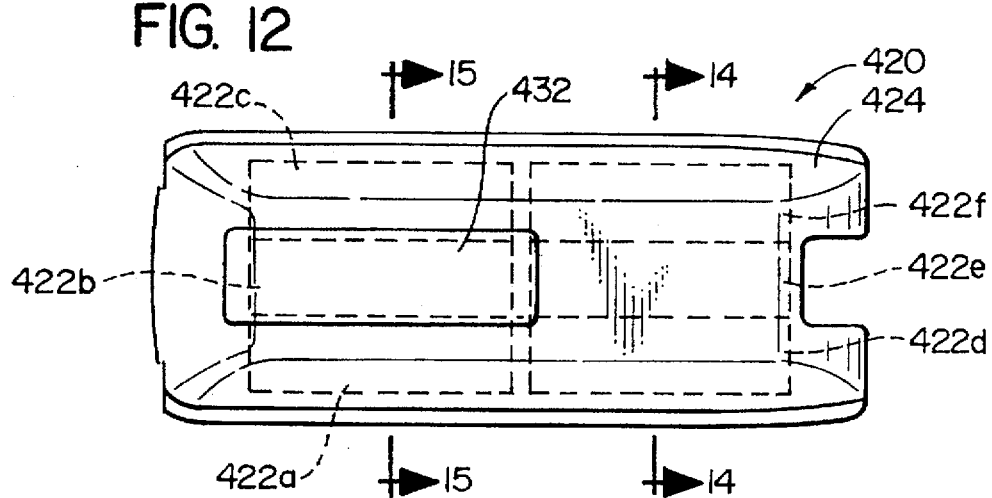
FIG. 12 depicts a top plan view of a third embodiment of a power supply of the present invention.
Figure 13:
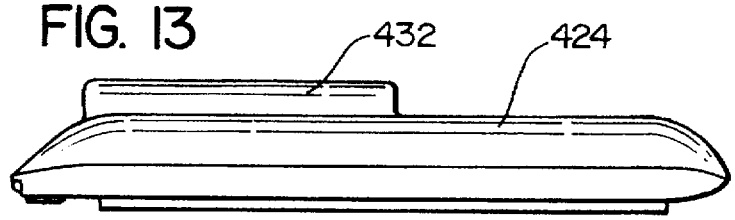
FIG. 13 is a side elevational view of the power supply shown in FIG. 12.
Figure 14:
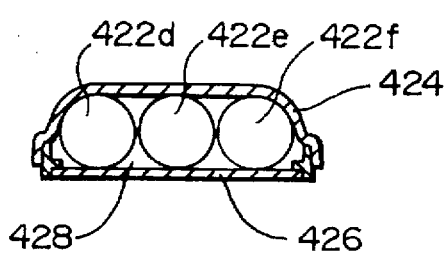
FIG. 14 is a section view taken along lines 14—14 in FIG. 12.
Figure 15:
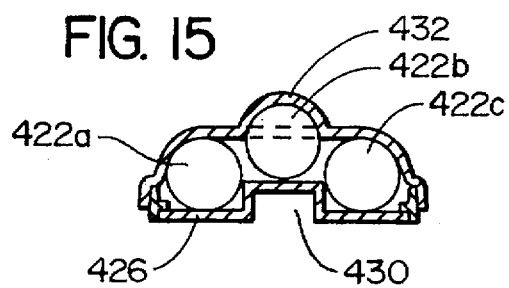
FIG. 15 is a section view taken along lines 15—15 in FIG. 12.

The power supply 24 comprises a container assembly 26 and an electrical portion 28 (FIG. 5). The container assembly 26 comprises the following components: a housing 30, a terminal plate 32, and a cover member 34.

The container assembly 26 performs several functions. First, the assembly 26 defines an interior battery chamber 38 (FIG. 3) in which batteries 40 are contained. Second, the assembly 26 forms appropriate mounting surfaces on which various electrical components such as battery terminals and the like are mounted. Finally, built into the case is a latch mechanism 42 and rail structure 44 that forms an attachment means that allows the power supply 24 to be attached to the telephone 22.

The mechanical connection between the power supply 24 and the telephone 22 is conventional and is not per se part of the present invention. In this context, the portions of the container assembly 26 that allow the power supply 24 to be connected to the telephone 22 are not critical, except that the case 30 must provide reliable mechanical attachment and electrical contacts by which the power supply 24 may provide power to the telephone 22.

Referring now to FIG. 3, it can be seen that the case 30 comprises an outer wall 46 and first and second side walls 48 and 50 in addition to first and second end walls 52 and 54 as shown in FIG. 1. The battery chamber 38 is defined on five sides by these walls 46–54. An access opening 55 is formed on the sixth side of the battery chamber 38, but the cover member 34 can be arranged to cover this opening 55 as will be discussed in further detail below.

Formed on the side walls 48 and 50 is a first set of battery pack terminals 56 and 58. Twelve of these terminals 56 and 58 are mounted on the side walls 48 and 50 such that battery negative ends 60 and battery positive ends 62 securely engage the terminals 56 and 58, respectively, when the battery 40 is placed into the battery chamber 38.

Flanges 64 and 66 are formed on the bottom wall 46 and flanges 68 and 70 are formed on the cover member 34 to align the ends 60 and 62 of the battery 40 with the terminals 56 and 58.

The terminals 56 and 58 are made of metal that is bent towards the battery chamber 38 such that, when the battery 40 is placed in its proper position within the chamber 38, the battery ends 60 and 62 distort the terminals 56 and 58 slightly towards the end walls 48 and 50. This spring loads the terminals 56 and 58 and ensures a secure electrical contact between each battery 40 and its associated terminals 56 and 58.

Referring now to FIG. 2, schematically depicted therein is the portion of the set of terminals 56 and 58 that are arranged along the side wall 50, a similar series being arranged along the side wall 48. FIG. 2 illustrates that the terminals 56 and 58 are alternately spaced along the side walls 48 and 50; and the terminals 56 and 58 are connected in pairs such that the batteries 40 are connected in series to form a single voltage source having a voltage equal to the sum of the voltages across each of the batteries. The voltage source formed by the batteries 40 is depicted at 72 in the schematic diagram of FIG. 5.

Referring for a moment back to FIG. 3, depicted at 74 therein is an instruction sheet that is placed on an inner surface 76 of the bottom wall 46 between the flanges 64 and 66. This instruction sheet 74 has textual and graphical instructions indicating the proper orientation of the batteries 44 when placed into the battery chamber 38.

In addition to the first set of battery pack terminals 56 and 58, the power supply 24 comprises a second set of battery pack terminals 76, 78, and 80, and a third set of battery pack terminals 82, 84, 86, and 88. The second set of terminals 76–78 are formed on the terminal plate 32 at a location that forces these terminals 76–80 to come into contact with corresponding device terminals 76a, 78a, and 80a (FIG. 5) on the telephone 22. The third set of battery pack terminals 82–88 will be discussed in more detail below.

The location and construction of the terminals 76a–80a on the telephone 22 is well known in the art and will not be described herein in detail. And because the location of the terminals on the telephone 22 is an established standard, the location of the terminals 76–80 on the terminal plate 32 is dictated by this standard.

Formed on the end wall 54 adjacent to the third set of terminals 82–88 is a switch 90. This switch 90 is a two-position switch which in its closed position establishes a connection in a circuit and in its opened position breaks an electrical connection in this circuit. The details of the physical construction of the switch 90 are well known in the art and will not be described herein more than necessary for an understanding of the present invention.

The exemplary switch 90 is a slide switch that comprises an actuator 92 that slides between two positions. The actuator 92 slides within a recess 94 formed in the end wall 54 and the actuator member 92 is flush with the outer surface of the end wall 54 such that the entire actuator member 92 is always within the chamber 94.

Figure 4:
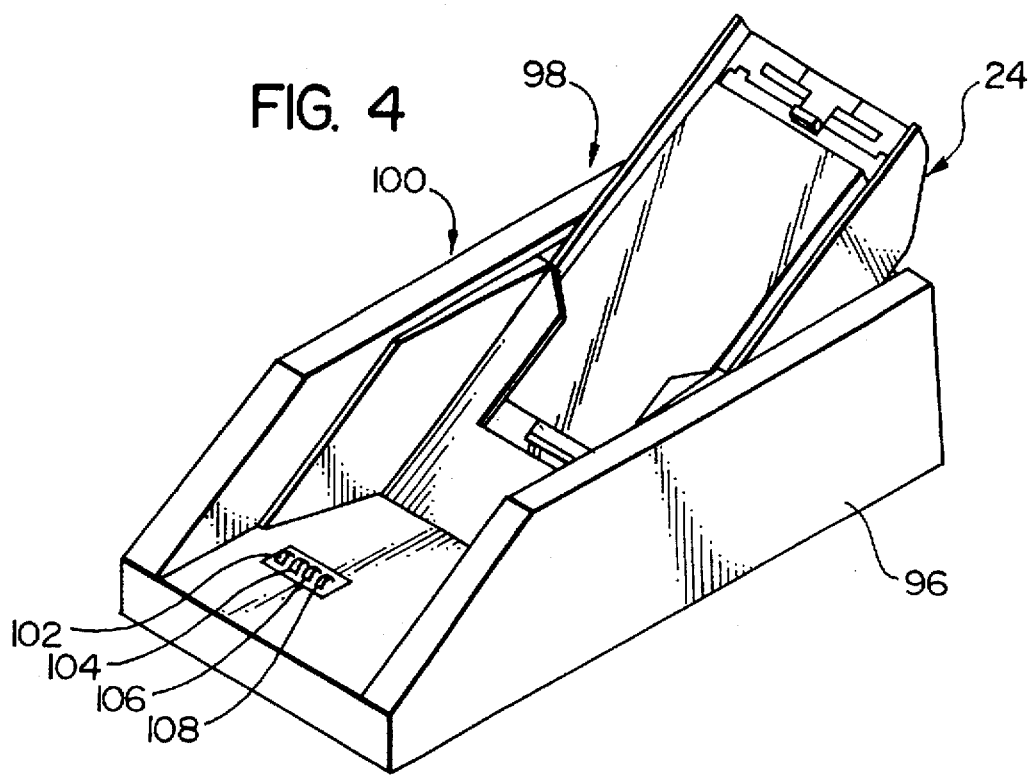
FIG. 4 is a perspective view showing the power supply as shown in FIGS. 1–3 being used with an industry standard charger for cellular telephones.

Referring now to FIG. 4, depicted therein is the power supply 24 mounted in a charger 96. The charger 96 is one of a number of such chargers that can be used to recharge a conventional power supply such as that commonly sold with the telephone 22. This exemplary charger 96 has a first slot 98 in which the power supply alone may be charged, and a second slot 100 in which the phone and power supply may be placed.

Shown at 102, 104, 106, and 108 are charger terminals that are arranged to engage corresponding terminals on a battery pack placed in the slot 100. An identical set of charger terminals 102a, 104a, 106a, and 108d (FIG. 5), while not visible in the view of FIG. 4, are formed in the slot 98. As shown in FIG. 5, the third set of terminals 82–88 on the power supply 24 engage the charger terminals 102a–108a.

Because it is flush with the outer surface of the end wall 54, the switch 90 does not interfere with electrical contact between the third set of battery pack terminals 82–88 and the corresponding terminals 102a–108a on the charger.

Referring now for a moment to FIG. 5, depicted therein is a schematic diagram showing the relevant electrical connections and components employed by the system of the present invention.

The power supply 24 of the present invention is represented by a box formed of broken lines. The telephone 22 and charger 96 are also depicted in FIG. 5.

FIG. 5 also depicts the connections formed by the mechanical engagement of the various terminals described above.

The electrical configuration shown in FIG. 5 is established by attaching the power pack 24 to the telephone 22 and placing them in the slot 98. In this case, the power supply 24 is electrically connected to the telephone 22 by contact of the second set of battery pack terminals 76, 78, and 80 with the device terminals 76a, 78a, and 80a. The power pack 24 is attached to the charger 96 by the contact of the third set of battery pack terminals 82, 84, and 86 with the charger terminals 108, 104, and 102, respectively.

Any terminals depicted in the mechanical drawings of FIGS. 1–4 but not in the schematic drawings of FIG. 5 are either unused spares or used for functions other than providing power such as temperature sensing and the like. These other functions are conventional an not per se part of the present invention.

An important element of FIG. 5 is the switch 90. This switch 90 is arranged such that, when in its open position, current is prevented from flowing from the charger 96 to the batteries 72. The batteries 72 are always connected, however, to the telephone 22.

The switch 90 is placed in its open configuration when alkaline batteries are used as the batteries 72 and is placed in its closed position when the batteries 72 are rechargeable. Proper use of this switch 90 will thus prevent the inadvertent charging of non-rechargeable alkaline batteries.

Additionally, as described above, the power supply 24 comprises a cover 34. This cover 34 is manually detachable from the terminal plate 32. The cover 34 may thus be removed to allow batteries to be removed from and placed into the battery chamber 38 through the access opening 55.

More specifically, hooks 120 and 122 are formed at one end of the cover and a detent latch 124 is formed at the other end of the cover 34. The hooks 120 and 122 are slid under the plate 32 and the latch 124 pivots downwardly until it engages a projection (not shown) on the plate 32. The latch 124 deforms slightly to allow the latch to pass the projection, at which point the latch 124 returns to its original position. The projection prevents the latch from pivoting back out under normal circumstances. But if cover 34 is to be removed, the latch is simply depressed slightly to deform it out of its original position. At this point, the cover 34 may be removed from the access opening 55.

As can be seen in FIG. 2, the cover 34 may be made at least partially and preferably completely transparent so that the batteries 40 are visible. This will provide the user with a visual indication of whether the batteries are rechargeable or not and thus provides an additional protection against an attempt to recharge alkaline batteries.

As briefly mentioned above, the removable cover 34 allows the batteries 40 to be inserted and removed. It also allows the batteries 40 to be either alkaline batteries or rechargeable batteries of some sort. The user may thus carry a supply of, or purchase, alkaline batteries for emergency situations, but use rechargeable batteries at other times.

At a minimum, the ability of the power supply 24 to handle both alkaline and rechargeable batteries may obviate the need to buy an extra battery pack, and keep this pack recharged, for emergency situations.

Referring again for a moment to FIG. 4, it can be seen that, in this configuration, the charger 96 may be used as a charger for AA batteries and not only as a dedicated charger for telephone power packs. More specifically, rechargeable batteries may be placed into the power pack 24 as shown in FIG. 2. The power pack 24 itself is then placed in the charger 96 as shown in FIG. 4 to charge the batteries therein.

Batteries so charged may be: (a) removed from the power pack 24 and placed into another electronic appliance requiring this size battery or (b) left in the power pack 24 for use with the telephone 22. This system of the present invention thus converts a dedicated cellular phone charger 96 into a general purpose charger for batteries to be used throughout the household.

Chargers such as the charger 96 are normally well designed, well constructed, and oftentimes quick charging devices, and the system of the present invention allows these devices to be used for all types of rechargeable batteries and not just those specifically dedicated for use with cellular telephones.

The system of the present invention has additional benefits such as reducing the costs of buying additional chargers, reducing the amount of space dedicated to such rechargers, and allowing the user to standardize on a given size battery throughout the household rather than attempting to store and keep charged batteries of different sizes.

By using the system of the present invention, batteries that are spent for one purpose but not for another need not be discarded. Batteries that do not hold a charge sufficient for powering a cellular telephone can be used to power a CD player or flashlight. The demands made of a CD player or flashlight on the battery are so significantly less than those made by a cellular telephone that these batteries have more than sufficient charge for these lower power devices.

Referring now for a moment to FIGS. 21 and 23, depicted therein is a battery jacket 220 that may be used as part of the system of the present invention.

Referring at first to FIG. 22, depicted therein is a standard battery compartment 224 of an undetermined portable electronic device. This compartment contains six batteries 226. The arrangement depicted in FIG. 22 is common for a wide variety of electrical equipment. Commonly, C or D sized batteries are used as the batteries 226.

As shown in FIG. 21A, a different size battery 228 is placed into the jacket 220. The jacket 220 is sized and dimensioned on the outside to mimic the form factor of the batteries 26, but has a central cavity 230 sized and dimensioned to receive the battery 28 to form a battery assembly 232.

As shown in FIG. 23, these battery assemblies 232 may be used in place of the batteries 226 in the battery compartment 224. The battery sleeves 220 hold the batteries 228 in proper alignment with battery terminals 234 and 236 and the terminals 238 and 240. The sleeves 220 perform this function by engaging the walls defining the chamber 224 and the adjacent sleeve to align the axes of the batteries with a terminal axis extending between the terminal pairs 234 and 236 and 238 and 240.

It can be seen in FIG. 21A that the battery 228 has a groove 242 arranged adjacent to one end. A corresponding projection 244 is formed in the interior wall 246 of the sleeve 220 which defines the central chamber 230. The projection 244 is an annular projection that engages the annular groove 242 in the battery, as shown in FIG. 23, to ensure that the battery 228 is in proper orientation with the battery sleeve 220 to form the battery assembly 232.

In particular, when the projection 244 engages the groove 242, inadvertent movement between the battery 228 and the sleeve 220 is prevented. But the mechanical engagement between the groove 242 and projection 244 may easily be overcome by pressing on either end of the battery to disengage the projection 244 from the groove 242 and slide the battery 228 out of the chamber 230.

In FIGS. 21–23, the batteries 226 are C batteries and the batteries 228 are AA batteries. AA batteries such as the batteries 228 are slightly longer than the C batteries 226. This extra length is marginal, however, and can easily be accommodated by additional compression of the spring terminals 236 and 240, as can be seen by comparison of FIGS. 22 and 23.

Referring for a moment now to FIGS. 21B and 21C, depicted therein are battery sleeve assemblies 220a and 220b. The battery sleeve 220a is designed to adapt a AA battery to fit into a battery compartment designed to receive one or more discrete C size batteries. The battery sleeve 220a is thus similar in purpose and use to the sleeve 220 described above. The battery sleeve 220b is designed to adapt a AA battery to fit into a battery compartment designed to receive one or more discrete D size batteries.

The sleeve assembly 220a differs from the sleeve 220 in that it comprises two parts: a cap 250 and a shell 252. The cap 250 comprises a cap cylinder portion 254 and an end portion 256. The cap cylinder portion 254 defines an opening 258 into which the battery 228 is placed. Slots 260 formed in the cylinder portion 254 allow this portion 254 to expand slightly as the battery 228 is inserted into the opening 258 to create a snug fit between the battery 228 and the cap 252. An annular projection 262 similar to the projection 244 described above mechanically engages the groove 242 in the battery 228 to maintain the battery 228 in it desired position. The shell 252 has a cylindrical outer surface 264 that mimics the form factor of a C size battery.

An attachment system 266 is formed by a threaded cylinder 268 extending from the cap end portion 256 and a threaded inner surface portion 270 on the shell 252. By axially aligning the cap 250 and shell 252, displacing these members 250 and 252 towards each other, and rotating one of these members 250 and 252 relative to the other about their common axis, the cap 250 is attached to the cylinder 252 as shown in FIG. 21B. Other attachment systems, such as temporary adhesives, latches, or snap fits, may be used in place of the attachment system 266.

Provided on the shell 252 is an inwardly extending alignment portion 272 having a conical inner surface 274. The surface 274 guides a negative end 276 of the battery 228 into its proper location as shown in FIG. 21B and holds this end 276 at this location during use.

With the arrangement shown in FIG. 21B, the battery 228 can be used anywhere a discrete C size battery is required. While perhaps slightly more expensive to manufacture and complicated to use than the sleeve 220 described above, removal of the battery 228 from the sleeve assembly 220a is perhaps easier than removal of the battery 228 from the sleeve 220. The diameter of a AA or AAA battery is fairly small, and it can be difficult to push the battery far enough out of the central cavity 230 that its end can be gripped when attempting to remove the battery 228.

With the sleeve assembly 220a, the cap 250 is simply removed from the shell 252. The cylindrical portion 254 is significantly shorter than the battery 228, so the end 276 thereof can easily be gripped to remove the battery from the opening 258.

The two part design shown in FIG. 21B is even more significant when the concept of a sleeve or sleeve assembly is applied to obtain a battery assembly mimicking the form factor of a D size battery, as shown in FIG. 21C.

In FIG. 21C, components that differ only in size from like components discussed with reference to FIG. 21B will be assigned the same reference character and not be discussed in detail below. Components that are similar to those used in FIG. 21B but differ in more than size will be assigned the same reference character plus the suffix "b" and discussed only to the extent of necessary to explain any differences.

The battery 228 is shorter than a D size battery; thus, not only need the diameter of the battery 228 be increased to correspond to the form factor of the D battery, the length needs to be increased. This effective increase in length is accomplished by a terminal cap 280 that is securely attached to the shell 252a at an end opposite to the end cap 250. The terminal cap 280 has an external contact portion 282 and an internal contact portion 284.

When the battery 228 is inserted into the cap 250 and the cap 250 attached to the shell 252a as shown in FIG. 21C, the negative end 276 of the battery 228 engages the internal contact portion 284 of the terminal cap 280. The terminal cap 280 is made of a conductive material such that current can flow between the external contact portion 282 and the battery negative end 276. And an overall length L between a positive end 286 of the battery 228 and the external contact portion 282 of the terminal cap 280 is substantially the same as that of a D size battery.

The sleeve assembly 220b and battery 228 thus mimic the form factor of a D size battery and creates an electric potential between the external contact portion 282 and the positive end 286 of the battery 228 equivalent to that of a D size battery. The sleeve assembly 220b and battery 228 may thus be used in place of one or more D size batteries in a battery compartment designed to accommodate such D size batteries.

The two part design of the sleeve assembly 220b allows the battery to be removed as described above with reference to the sleeve assembly 220a. If the sleeve 220 were somehow scaled up in size to mimic the form factor of a D size battery, the battery 228 would be shorter than the sleeve and could not be pushed out as is possible with the sleeve 220. The two part design of the sleeve assembly 220b allows the use of a relatively shorter battery to mimic the form factor of a relatively longer battery.

Depending upon the particular chemical make-up of the AA batteries 228, the total charge capacity of the battery assemblies 232a–f may be less than that of the batteries 226a–f. However, rechargeable AA and AAA batteries are now being sold in a high capacity form that rivals the charge holding capability of conventional C and D type batteries. It may thus be practical for a household to standardize on high capacity AA or AAA rechargeable batteries to the exclusion of C or D batteries.

Accordingly, by appropriate design of the container assembly 28, almost any battery size may be charged in the charger 96 and then used to power other electronic equipment. And, with an appropriate battery sleeve, the standard battery size or sizes can be modified for use with electronic devices designed for different size batteries.

Referring now to FIGS. 6–11, depicted therein is yet another power supply 320 constructed in accordance with the principles of the present invention. This power supply 320 is adapted to be mounted on cellular telephones such as those manufactured by Ericsson (not shown). Ericsson telephones inter-operate with the power supply 320 in same basic manner as the telephone 22 and power supply described above, but employ different mechanical and electrical connections.

Accordingly, the primary differences between the power supply 24 and the power supply 320 are that the power supply 320 cannot be recharged while attached to the telephone, holds only five batteries, has a different mechanical attachment system, and has a different arrangement of electrical contacts.

The mechanical attachment system of the power supply 320 is well-known in the art and will be discussed herein only briefly. As shown at 324 in FIG. 7 and 8, this attachment means basically comprises a pivot projection 326 and a detent latch 328. The pivot projection 326 fits under a similar projection on the housing of the telephone 322. The detent latch 328 has first and second detents 330 and 332. These detents 330 and 332 can deflect in the direction shown by arrow A in FIG. 8 out of their normal position into a deflected position to allow them to be placed under a projection on the telephone housing. Thus, the power supply 320 snaps onto the telephone 322 and can be released therefrom only by depressing the detents 330 and 332 in the direction shown by arrow A.

Referring now to FIG. 6, it can be seen therein that five batteries 334 are contained within the power supply 320. More specifically, the power supply 320 comprises a housing member 336 and a cover member 338 that form a battery pack assembly 339 defining a battery chamber 340. The cover 338 is attached to the housing 336 to cover an access opening 341 therein. A latch detent 342 engages the housing member 336 to allow the cover 338 to be attached to and removed from the housing 336. This cover 338 allows access to the battery chamber 340 such that the batteries 334 may be removed from and inserted into the chamber 340.

The exemplary cover member 338 is completely transparent to allow a user to determine what type of batteries are contained within the chamber 340, but can be made partially transparent if convenient.

Referring now to FIG. 7, depicted therein is a switch 342 mounted on the housing 336 such that a switch actuator 344 resides in a housing opening 346 formed in the housing 336. Again, the switch actuator 344 is recessed into the opening 346 such that it is flush with an outer surface of the housing 336.

Referring now to FIG. 11, depicted therein is a circuit diagram illustrating how the power supply 320 is attached to an electronic device such as the telephone 322 or a battery charger 348. In the case of the battery charger 348, the same mechanical attachment system 324 is used to attach the battery pack to the charger 348. When the battery charger 348 is attached, current is delivered to the batteries 334 represented by the block in FIG. 11. When the battery pack is connected to a telephone 322, current is drawn from the batteries 334.

A diode 350 and the switch 342 are connected such that current is allowed to flow only into the positive terminal of the batteries 334 when these batteries 334 are being charged. Specifically, the switch 342 is a single pull double throw switch that, in a first position shown in FIG. 11, allows current to bypass the diode 350 and flow both to and from the batteries. When in the switch is in its second position, the diode 350 prevents current from flowing from the batteries. The switch is thus placed in its first position when rechargeable batteries are used and in its second position when non-rechargeable batteries are used.

Referring now both to FIGS. 8 and 11, depicted therein at 354, 356, and 358 are the terminals that contact similarly arranged terminals on the telephone 322 or charger 348 to complete the circuit shown in FIG. 11. Any terminals shown in the mechanical drawing of FIG. 8 but not in the schematic drawing of FIG. 11 are either unused or use for functions other than power transfer.

Referring now to FIGS. 12–16, depicted therein is yet another power supply 420 of the present invention. The power supply 420 is very similar to the power supply 320 described above but is designed for use on cellular telephones manufactured by Nokia.

From an electrical standpoint, the power supplies 420 and 320 are identical, and the circuit depicted in FIG. 11 also represents the circuit formed when the power supply 420 is attached to its corresponding telephone and/or charger.

The primary differences between these power supplies are that the power supply 420 accommodates six batteries, has a different mechanical attachment system, and has a different arrangement of electrical contacts.

The power supply 420 comprises a power pack assembly 421 comprising a housing 422 to which a cover member 424 is attached to define a battery chamber 426. When the cover member 424 is removed, batteries can be placed into and removed from the battery chamber 426 through an access opening 427. The batteries 422 are arranged in series and correspond, schematically, to the batteries 334 shown in FIG. 11.

The telephone and charger to which the battery pack 420 is attached has a projection that must be accommodated for by a recess 430 in the cover 426. To allow six batteries to be accommodated within the chamber 428, a projection 432 is formed on the housing 424 above the groove 430. The latching detent which allows the power supply 420 to be attached to its corresponding telephone or charger is formed on the telephone and charger.

Figure 16:
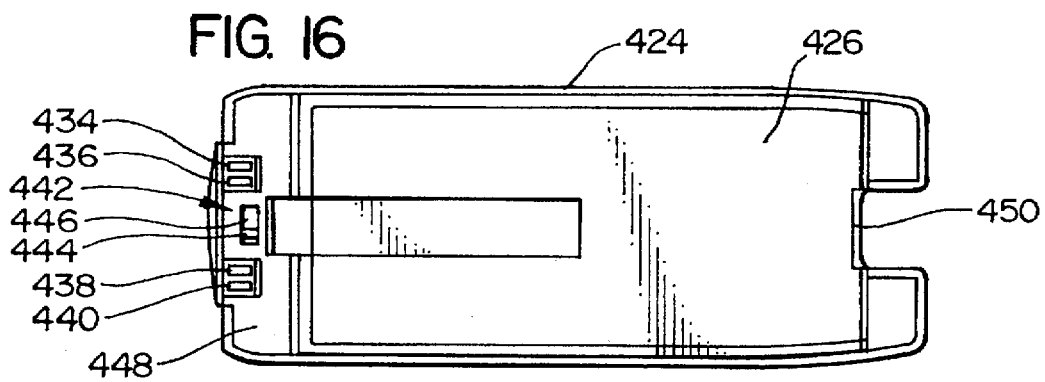
FIG. 16 is a bottom plan view of the power supply shown in FIG. 12.

Referring to FIG. 16, terminals 434, 436, 438, and 440 are depicted therein. The terminals 434 and 440 correspond to the terminals 356 and 354, respectively, shown in FIG. 11.

The terminals 436 and 438 are either unused or used for functions other than transferring power into or out of the power supply 420.

FIG. 16 also shows the placement of a switch 442 that corresponds to the switch 342 of FIG. 11. The switch 442 has a switch actuator 444 and is mounted in a slot 446 formed in a bottom wall 448 of the housing 424. This actuator member 444 is recessed within the opening 446 such that it is flush with a surface of the wall 448.

The cover 426 is detachably attached to the housing 424 by a detent latch shown at 450. This cover 426 is also partially or wholly transparent to allow the user to determine whether alkaline or rechargeable batteries are loaded within the battery chamber 428.

The power supplies 320 and 420 can be used in a manner basically similar to that of the power supply 20 described above. In particular, these power supplies may be used with conventional rechargeable batteries in the manner of a conventional power supply for a telephone. In emergency situations, alkaline batteries may be used.

Additionally, because the batteries are removable from the chamber 428, when rechargeable batteries are used these batteries may be charged using the charger supplied with the telephone and then removed and put into an unrelated consumer electronics device.

The power supplies 320 and 420 allow dedicated telephone chargers to be used as a general purpose charger with the benefits attendant thereto.

Referring now to FIGS. 17–20, depicted therein is a power supply 520 constructed in accordance with the principles of the present invention. This power supply 520 is to be attached to a video camera 522 or a charger having the same electrical and mechanical attachments as the video camera 522. In FIGS. 18–20, a power supply housing 524 of the present invention is shown by solid lines, while a power supply housing of the prior art is shown by broken lines. Dashed lines indicate batteries 526 contained within the housing 524.

As shown in FIG. 18, twelve batteries 526 are contained within a battery chamber 528 defined by the housing 524 and a cover member 530. A mechanical engagement system 532 is formed on one side of the housing 524 to allow the power supply 520 to be mechanically attached to the video camera 520 in a known manner. Additionally, electrical terminals (not shown) are formed to complete a circuit substantially the same as that shown in FIG. 11 above.

With the power supply 520, the lid 530 is attached to the side of the housing 524 opposite that of the attachment system 532. This housing 530 is detachably attached to the housing 524 using appropriate latches to lock it in place but allow manual removal thereof.

Shown in FIG. 18 is a switch 534 having a switch actuator 536. The switch 534 corresponds to the switch 342 in FIG. 11 and is formed such that it does not interfere with the mechanical attachment system 532.

The batteries 526 of the power supply 520 are consumer capped batteries that are slightly longer and narrower than the industrial capped batteries of the power supply conventionally sold with the video camera 522. Thus, as is shown in FIGS. 18–20, the housing 524 is slightly shorter and wider than that of the conventional power supply attached to the video camera 522. Because of a projection 538 formed on the video camera 522, the additional width of the power supply 520 is shifted to one side as perhaps best shown in FIG. 20. Thus, whenever a housing is developed for a specific electronic device, the housing may need to be tailored for the physical structure of that particular device to ensure a proper mechanical fit.

Referring now to FIGS. 24–25, depicted therein is a second exemplary battery sleeve 620 constructed in accordance with, and embodying, the principles of the present invention. This sleeve 620 is similar to the sleeve 220 described above in that it is employed to use batteries of one form factor in a space designed for batteries of another form factor.

In particular, the battery sleeve 520 allows, for example, five C batteries 622 (1.2 volt) to be used in place of a 6-volt battery of conventional design. Other batteries such as AAA or AA may be used in place of the C batteries 622, however, with proper design of the sleeve 220 and the electrical connections formed therein.

In particular, the sleeve 620 comprises a housing 624 and a cover 626 that define a battery chamber 628. The cover member 626 is detachably attached to the housing 624 such that the batteries 622 may be placed into and removed from the housing 624. Again, either alkaline or rechargeable batteries may be used as the batteries 622. If batteries other than C type batteries are used, the battery chamber will be configured to handle an appropriate number of batteries of the given form factor.

The cover member 626 is mechanically attached to the housing 624 by detent latches 630 and 632 that engage recesses 634 and 636 formed in the housing 624. These detents 630 and 632 snap into the recesses 634 and 636 but may be manually removed from these recesses 634 and 636 to remove the cover member 626 by application of specific, appropriate manual force at locations shown by reference characters 638 and 640.

Not shown within the housing 624 are terminals and wiring that connect the batteries 622 in series and connect the appropriate terminals of these batteries to spring terminals 642 and 644 on top of the housing 624.

The battery sleeve 620 is simply one example of a device that allows batteries of one form factor to be used in a situation designed for batteries of another form factor. In the exemplary sleeve 620, four C size batteries of 1½ volts each are used in series to obtain the equivalent of a 6-volt battery. By using other chamber sizes and terminal arrangements, AA batteries may be stacked within the chamber 628 to obtain the appropriate battery voltage.

Figure 26:
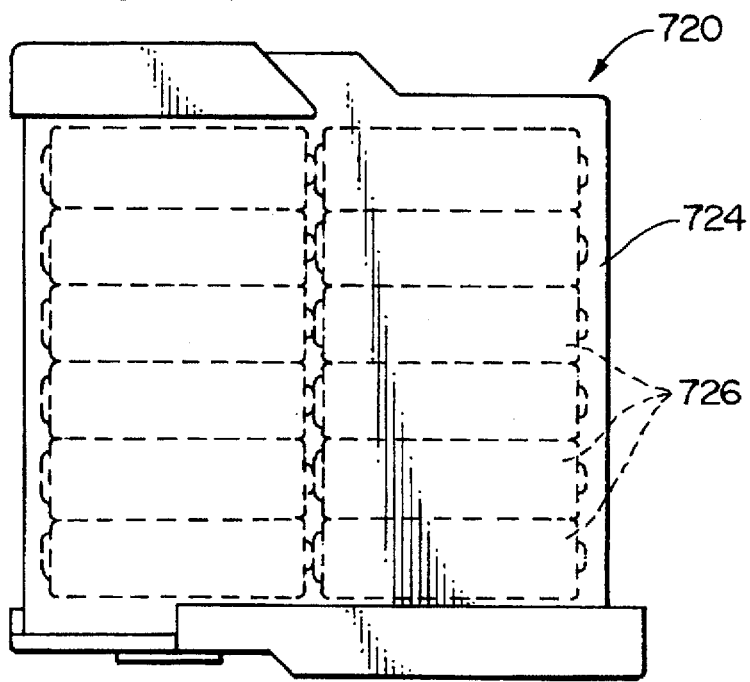
FIG. 26 is a top plan view of a fifth embodiment of a power supply of the present invention, this power supply being adapted to power a portable computer.

Referring now to FIG. 26, depicted therein is yet another power supply 720 constructed in accordance with, and embodying, the principles of the present invention. The power supply 720 is designed for use in a portable computer 722 and contains a battery chamber 724 designed to accommodate twelve AA batteries 726. These batteries 726 may either be alkaline batteries or rechargeable batteries.

Figure 27:
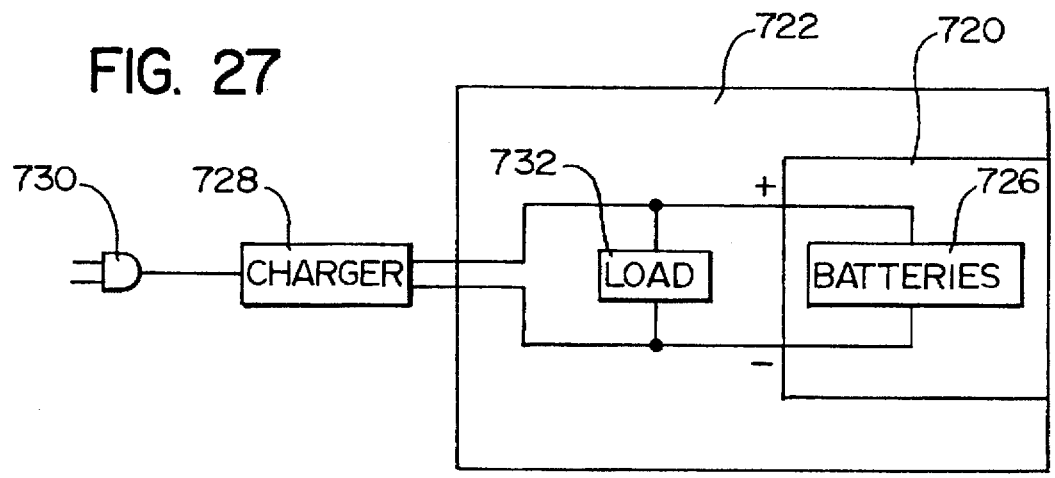
FIG. 27 depicts a simplified electrical schematic showing how the power supply of FIG. 26 integrates with a charger and portable computer.

Referring now to FIG. 27, depicted therein is a schematic diagram depicting how the power supply 720 would be attached to the computer 722. As shown in FIG. 27, the power supply 720 is, mechanically, a cartridge that fits into a slot in the computer 722. Connected to the computer 722 is a charger 728 that is plugged into utility power using a plug 730. The charger develops a DC voltage across a load 732 that energizes the load and, while the charger is connected to the computer 722, charges the battery 726 within the power supply 720. When the charger 728 is disconnected from the computer 722, power to the load is provided by the battery 726 within the power supply 720.

As with the power supplies described above, the power supply 720 comprises a cover that may be removed to allow the battery 726 to be introduced and removed from the battery chamber 724. Either rechargeable batteries or alkaline batteries may be used as the battery 726.

Figure 28:
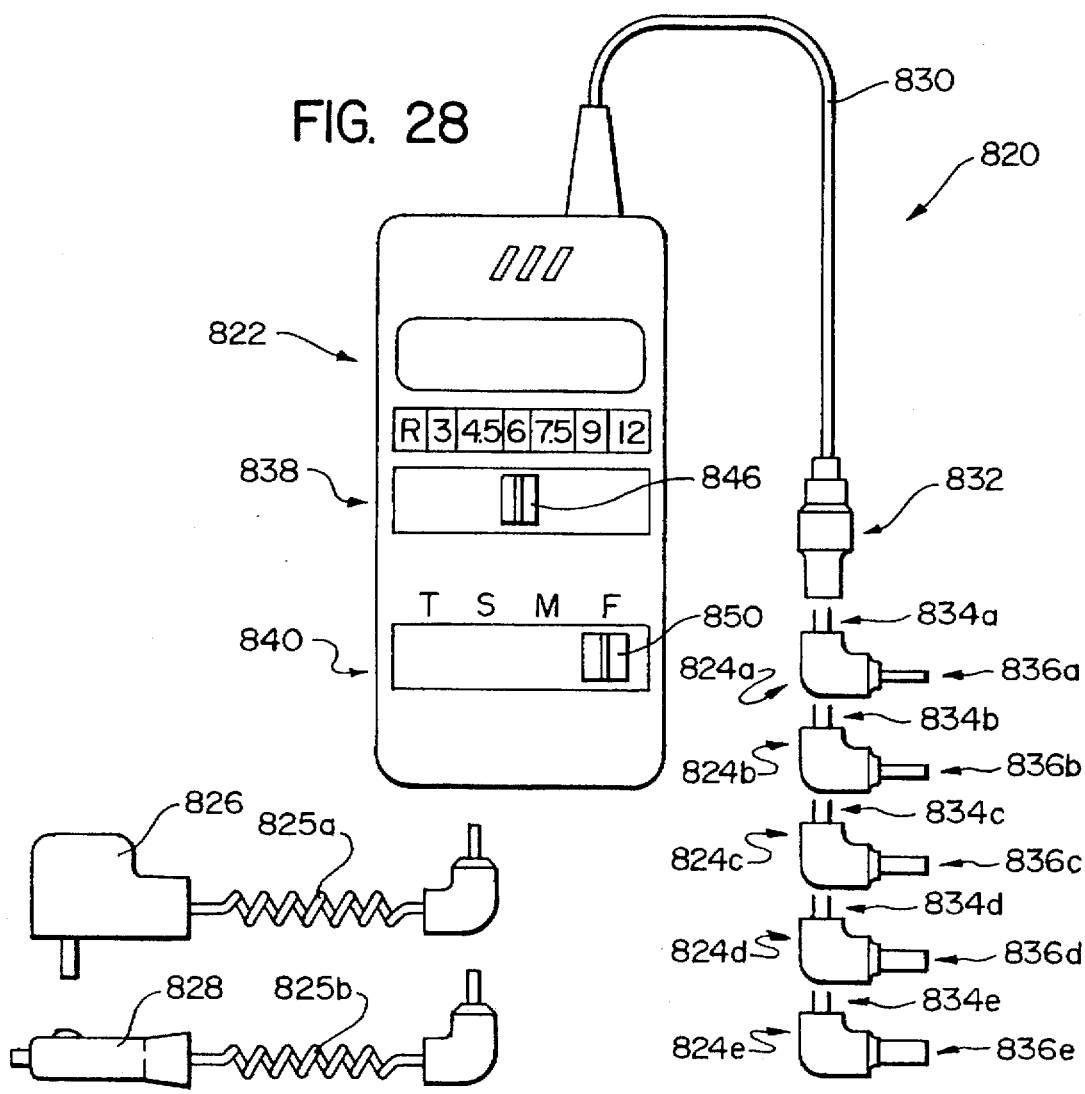
FIG. 28 is a plan view depicting a battery charger/power supply subsystem that may be used as part of the system of the present invention.
Figure 29:
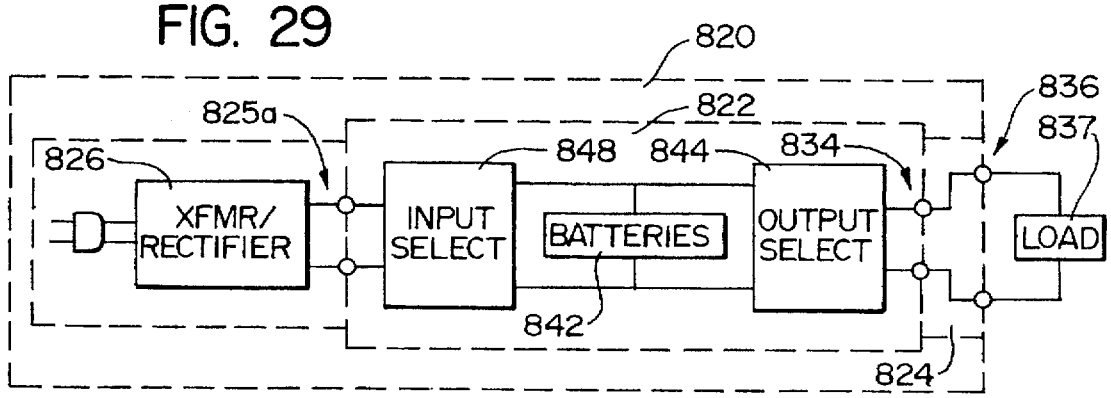
FIG. 29 is a block diagram depicting the major electrical components of the charger/power supply subsystem shown in FIG. 28.

Referring now to FIGS. 28 and 29, depicted therein is charger/power supply sub-system 820 that may be used as part of the system of the present invention. The system 820 comprises what will be referred to as a boot module 822, one or more adapters 824a–e, and a power supply cord 825a or 825b that is part of either a utility power transformer/rectifier unit 826 or an automobile connector 828. The unit 826 and connector 828 are well-known in the art and result in a 12 volt DC signal being present on the power supply cord 825. Either of these components 826 and 828 may be used to supply the boot module 822 with a 12 volt power supply signal.

Attached to the boot module 822 is a supply cord 830 having a female two-prong connector 832 formed at a distal end thereof. Each of the adapters 824 has a male two-prong connector portion 834a–f and a male single-prong connector portion 836a–f. The two-prong connector portions 834a–f are identical and are adapted to form an electrical connection with the two-prong connector 832. The single-prong connector portions 836a–f are different from each other, and each one is designed to mate with a corresponding female single-prong connector (not shown) on an electronic device 837.

The boot module 822 comprises an output selector switch 838, an input selector switch 840, and one or more batteries 842 (FIG. 29). The batteries can either be rechargeable or non-rechargeable, although in most cases rechargeable batteries would be used. In event, the batteries are arranged such that the total voltage across the batteries 842 is 12 volts.

As shown in FIG. 29, the output select switch 838 forms a part of an output select circuit 844 that is arranged between the output cord 830 and the batteries 842. By sliding an actuator member 846 of the switch 838, any one of the following voltages may be selected as the voltage present at the female two-prong connector 832: 3 volts, 4.5 volts, 6 volts, 7.5 volts, 9 volts, or 12 volts. The switch 838 has an additional setting for discharging of the batteries 842.

The input selector switch 840 forms a part of an input select circuit 848 that is connected between the power supply cord 825 and the batteries 842. The input select circuit 848 determines the current flow to the batteries 842. In particular, the input select switch 840 comprises an actuator member 850 that may be slid among settings that provide one of the following types of charging: trickle, slow, medium, and fast.

The boot module 822 thus functions as a charger for the batteries 840 and/or as a power supply for an electronic device. The boot module 822 can obtain power either from utility power or another source such as an automobile, can charge any type of battery, and can be configured to supply power to any device for which an adapter 824 is provided and which operates at one of the voltages selectable using the output select switch 838.

The boot module 822 may be provided with a clip to allow it to be attached to the user's clothing, with the output cable 830 extending from the location of the boot module 822 to the location of the electronic device being powered.

From the foregoing, it can be seen that the boot module 822 forms a universal battery charger and power supply that can be figured to charge almost any battery and supply power to any type of electronic device requiring one of several standard voltages up to 12 volts.

In certain situations, a battery pack may require five alkaline batteries and six rechargeable batteries to obtain the appropriate voltage and charge times. In this case, a dummy battery may be provided to take the sixth battery space when alkaline batteries are used. This dummy battery will be arranged in series with the other batteries and can include an over-current protection circuit that opens when excessive current passes therethrough.

Additionally, the outer surface of this dummy battery can be configured such that the dummy battery is somewhat dumbbell shaped, having increased diameter ends and a decreased diameter middle portion. The increased diameter ends will ensure that the dummy battery fits into the appropriate battery space, while the decreased diameter middle portion creates a space between the housing and the dummy battery.

A switch actuator can be mounted within the battery pack housing adjacent to a switch location where the dummy battery will be placed. The switch actuator is spring-loaded such that, when the dummy battery is placed in the switch location, the switch actuator is biased into the area vacated by the reduced diameter middle portion of the dummy battery.

The switch to which the actuator is connected is thus placed into a first state. But when a real, rechargeable battery is placed into the switch location, it does not have such a reduced diameter portion, and it depresses the switch actuator such that the switch is placed into a second state. In this manner, the switches 90 and 342 described above can be automatically operated as required depending upon whether rechargeable or non-rechargeable batteries are used.

From the foregoing, it should be clear that the present invention embodies a systematic approach to providing power to portable electronic devices. The discussion above provides a number of examples that illustrate this system. But it should be clear that the system may be embodied in forms other than those described above.

We claim:

1. A system for providing power to portable electronic devices, comprising:

a first portable electronic device designed to obtain power through device terminals from a battery pack containing batteries;

a second portable electronic device designed to obtain power from at least one discrete battery arranged in a battery compartment;

at least one non-rechargeable battery;

at least one rechargeable battery;

a battery pack assembly comprising a housing portion defining a battery chamber and an access opening through which the battery chamber may be accessed;

a cover portion detachably attached to the housing portion, where the cover portion covers the access opening when attached to the housing portion, a plurality of chamber terminals, where the housing portion is configured such that batteries placed within the battery chamber contact the chamber terminals, a plurality of battery pack terminals, means for conducting electricity from the chamber terminals to the battery pack terminals, and attachment means formed on the housing portion for allowing the battery pack assembly to be detachably attached to the first portable electronic device, where the battery pack terminals come into contact with the device terminals when the battery assembly is attached to the first portable electronic device;

a charger device for charging rechargeable batteries, the charger device comprising charger terminals across which an electrical potential is developed, and means for mounting the battery pack assembly onto the charger device such that the charger terminals engage the battery pack terminals; wherein to charge the at least one rechargeable battery, the at least one rechargeable battery is placed into the battery chamber and the battery pack assembly is mounted onto the charger device such that current flows from the charger device to the at least one rechargeable battery through the charger, battery pack, and chamber terminals;

to provide power to the first portable electronic device, one of the at least one rechargeable battery and the at least one non-rechargeable battery is placed in the battery chamber, and the attachment means is employed to attach the battery pack assembly to the first portable electronic device such that current flows from the at least one rechargeable battery to the first portable electronic device through the battery pack and device terminals; and to provide power to the second portable electronic device, one of the at least one rechargeable battery and the at least one non-rechargeable battery is placed in the battery compartment.

2. A system as recited in claim 1, in which the cover portion is configured to allow a user to determine whether rechargeable or non-rechargeable batteries are contained within the battery chamber.

3. A system as recited in claim 2, in which at least some of the cover portion is transparent to allow the user to see the batteries contained within the battery chamber.

4. A system as recited in claim 3, in which the cover portion is entirely transparent.

5. A system as recited in claim 1, in which the battery pack assembly further comprises switch means operable to prevent current from flowing from the charger device to the battery pack terminals when non-rechargeable batteries are placed in the battery chamber.

6. A system as recited in claim 1, in which the battery pack terminals that engage the device terminals when the battery pack assembly is attached to the first portable electronic device also engage the charger terminals when the battery pack assembly is mounted onto the charger device.

7. A system as recited in claim 6, further comprising a disconnect circuit selectively operable to allow current to flow from the battery pack terminals to the chamber terminals when rechargeable batteries are within the battery chamber and prevent current from flowing from the battery pack terminals to the chamber terminals when a non-rechargeable battery is within the battery chamber.

8. A system as recited in claim 1, in which the battery pack comprises first and second sets of battery pack terminals, where the first set of battery pack terminals are arranged to engage the device terminals when the battery pack assembly is attached to the first portable electronic device and the second set of battery pack terminals are arranged to engage the charger terminals when the battery pack assembly is mounted on the charger device.

9. A system as recited in claim 8, further comprising switch means operable to allow current to flow the second set of battery pack terminals to the chamber terminals when a rechargeable battery is contained within the battery chamber and prevent current from flowing from the second set of battery pack terminals to the chamber terminals when a non-rechargeable battery is contained within the battery chamber.

10. A system as recited in claim 1, in which the rechargeable and non-rechargeable batteries are of a first battery type, the system further comprising a battery sleeve for receiving at least one of the rechargeable and non-rechargeable batteries to form a battery assembly, where the physical dimensions of the battery assembly are approximately the same as the physical dimensions of a second battery type.

* * * * *